Jan. 10, 1928.

J. BADEKER 1,655,853

METALLIC ROD PACKING

Filed Aug. 25, 1920

2 Sheets-Sheet 1

Inventor:
JOHN BADEKER.

Witness:
R. J. Honomichl

By David O. Barnell
Attorney

Jan. 10, 1928. 1,655,853
J. BADEKER
METALLIC ROD PACKING
Filed Aug. 25, 1920 2 Sheets-Sheet 2

Inventor:
JOHN BADEKER.

Witness:
R. J. Honomichl.

By David O. Barnell
Attorney

Patented Jan. 10, 1928.

1,655,853

UNITED STATES PATENT OFFICE.

JOHN BADEKER, OF JOLIET, ILLINOIS, ASSIGNOR TO CHICAGO STANDARD METALLIC PACKING COMPANY, A CORPORATION OF NEBRASKA.

METALLIC ROD PACKING.

Application filed August 25, 1920. Serial No. 405,867.

My invention relates to metallic rod-packing of the type employing packing-rings comprising segments or sections of which the abutting end-faces extend tangentially, or substantially so, to the rod and the bore of the packing-ring. It is the object of my invention to provide, in a rod-packing of this type, means for holding adjacent packing-rings in fixed circumferential relation to each other, whereby said rings are prevented from moving into such relation as to bring the joints thereof into longitudinal alinement with each other. A further object of my invention is to provide efficient means for preventing the outer overlapping end-portions of the ring-sections or segments being displaced outwardly from the rod. A further object of my invention is to provide means for yieldingly resisting closing of the ring-sections or segments upon the rod, whereby to reduce the pressure and friction between the packing and the rod, and thus correspondingly reduce wear of said parts, while preserving a fluid-tight joint between the same. A further object of my invention is to provide, in a packing of this type, retaining-springs so arranged that the pressure thereof is exerted constantly near those ends of the segments or ring-sections which move toward the rod during the closing of the packing-rings thereon. Further and minor objects of my invention will be set forth hereinafter.

Figure 1:
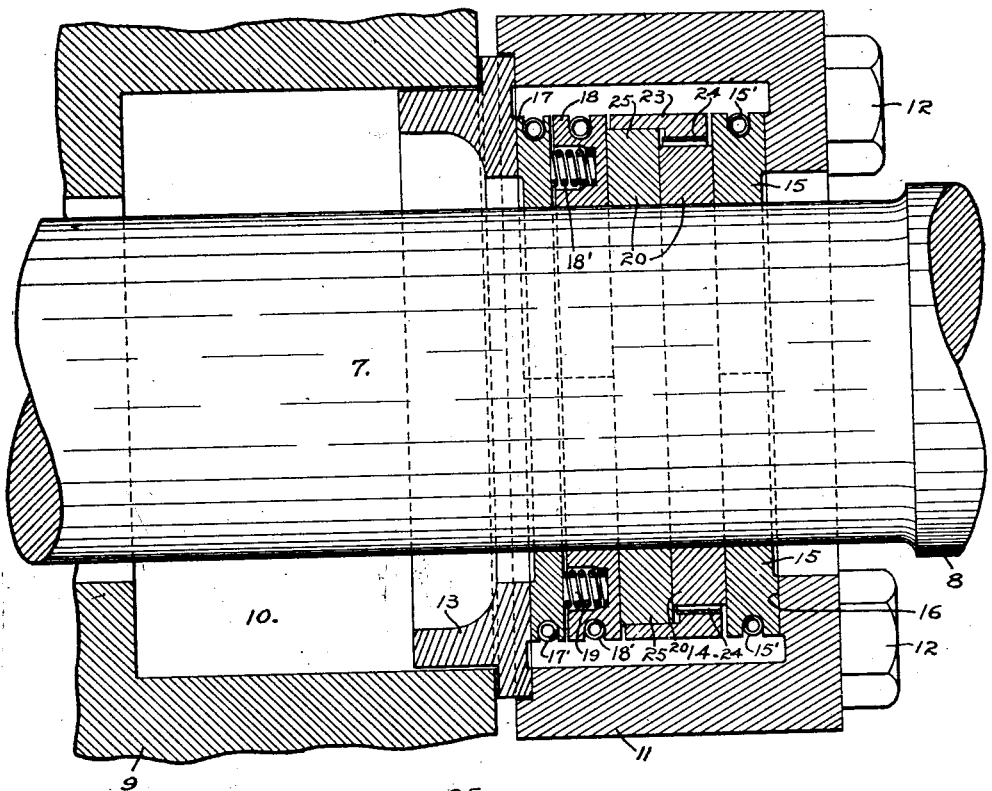
Figure 2:
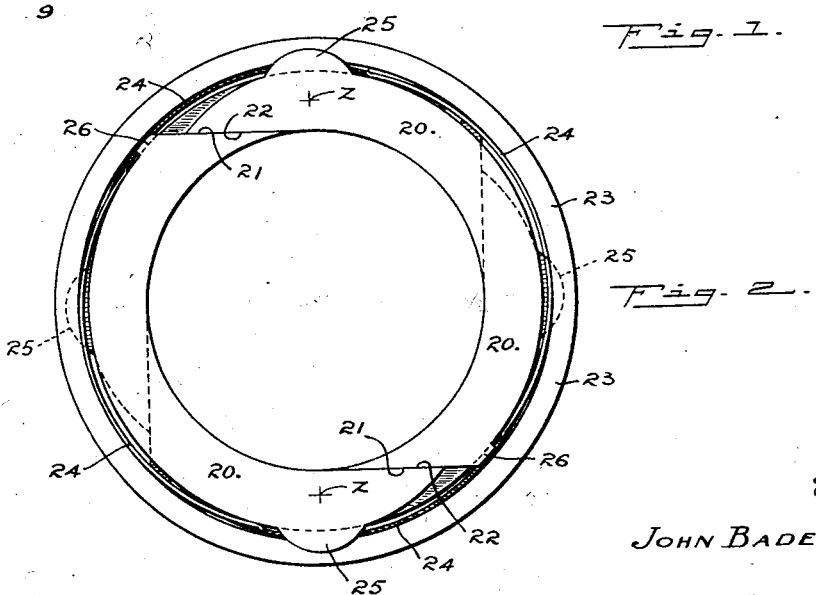
Figure 3:
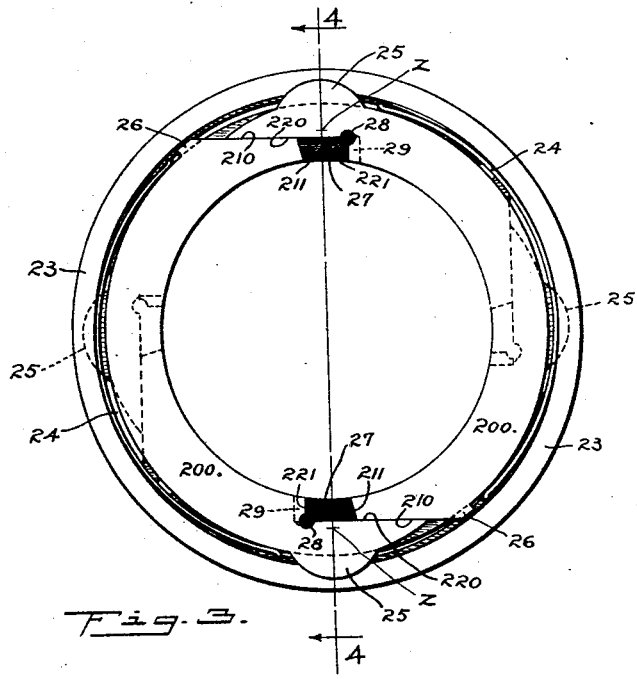
Figure 4:
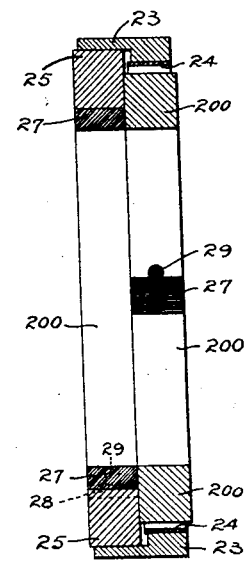
Figure 5:
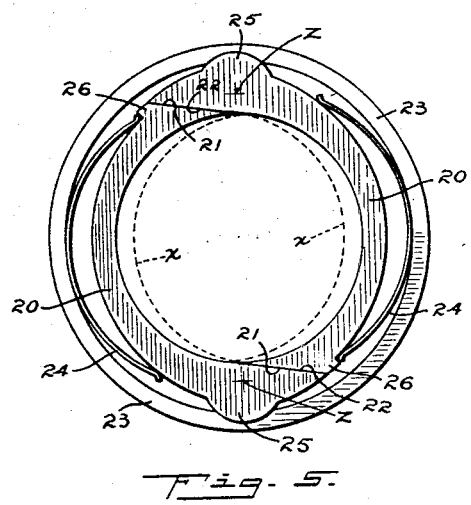
Figure 6:
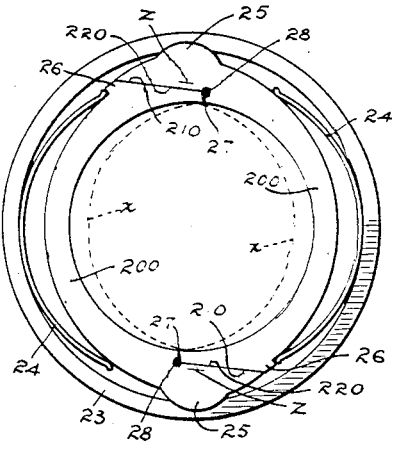

In the accompanying drawings Fig. 1 is a longitudinal or axial section of a rod-packing assembly embodying my invention, Fig. 2 is a front view of the retaining ring with the packing assembled therein, Fig. 3 is a similar view, showing a modified form of the packing adapted for use where it is subjected to high pressure, Fig. 4 is an axial section on the line 4—4 of Fig. 3, Fig. 5 is a front view of a packing-ring and retaining ring, showing the form of the packing-ring when worn, and Fig. 6 is a similar view of the modified or high-pressure form of the packing.

There is shown in Fig. 1 a typical arrangement of the packing, with auxiliary or accessory devices, suitable for use on the piston-rod of a locomotive. In the arrangement shown, the packing is disposed around a piston-rod 7 having an enlarged portion 8 at the end thereof which is external to the engine-cylinder. The cylinder-head 9 has therein a stuffing-box 10, and at the open end of the stuffing-box a gland 11 is secured upon the head by suitable bolts 12. At the rear side of the gland there is a neck-ring 13 having an outwardly extending flange which is clamped between the head and the rear edges of the gland so as to form fluid-tight joints therewith. In each of such parts 9, 11 and 13 the bore or central opening is of sufficient diameter to pass over the enlarged rod-portion 8, whereby there is a considerable clearance space around the portion of the rod which normally passes through said parts.

In the gland-chamber 14, adjoining the front end thereof, a stop-ring 15 is disposed around the rod. Said stop-ring fits slidably against the inner face 16 of the gland, with which it forms a fluid-tight joint, and fits somewhat loosely upon the rod, not being designed to form a fluid-tight joint with the latter. In the rear portion of the chamber 14 a back-ring 17 is disposed around the rod, said back-ring resting slidably against the neck-ring 13. The follower-ring 18 is disposed around the rod in front of the back-ring 17, and is provided in its rear face with several cylindrical pockets in which are disposed small coil springs 19, the ends of the latter abutting the back-ring and said springs serving to press the follower-ring yieldingly forward against the packing-rings, which are disposed between the follower and the stop-ring. The stop-ring 15, back-ring 17 and follower-ring 18 are each divided into two parts by splitting the same in a plane intersecting the axis of the rod, and the two parts of the respective rings are held together by means of annular coil springs 15', 17' and 18' disposed in grooves formed in the peripheral faces thereof. Said rings are formed as described, to enable them to be assembled around the rod, since it would be impossible to pass an integral ring over the enlarged portion 8 of the rod unless the bore of the ring was larger than said rod-portion.

As hereinbefore mentioned, the packing-rings consists of sections or segments having abutting plane-surfaced end-faces which extend tangentially, or substantially so, to the rod. Referring particularly to the structure illustrated in Figs. 1, 2 and 5, the body-portions 20 of the segments are rectangular in transverse section, and the end-faces 21 and 22 are parallel to each other, whereby two of the segments form a complete ring when said tangential end-faces 21 and 22 are placed respectively in contact with each other. It will be observed that the end-face 21 of each segment is exposed outwardly of the rod, and the face 22 is exposed inwardly or toward the rod, whereby, with respect to the overlapping end-portions of the segments, those having the outwardly exposed faces 21 may be designated as the inner ends of the segments, and those having the inwardly exposed faces 22 may be designated as the outer ends of the segments. A pair of the packing-rings, each consisting of two of the described segments, is disposed within a housing or retaining-ring 23 of which the width or axial dimension is slightly less than the combined thickness of the packing-rings. Between the retaining-ring and each segment of the packing-rings, there is disposed a spring 24 which is so shaped that it tends to assume a bowed or arcuate form, of a radius considerably less than that of the bore or inner surface of the retaining-ring, whereby the ends of the springs press inwardly upon the segments, and the middle portions of the springs press outwardly against the retaining-ring. As the retaining-ring is substantially unyielding, the pressure of the springs 24 exerted inwardly upon the segments tends to close the latter upon the rod, and thus holds the inner concave faces thereof against the rod even when there is no pressure as of steam or the like, within the gland-chamber 14. It will be understood, however, that the principal pressure exerted upon the packing is not that of the retaining-springs, which merely hold the segments in place against the rod, but is the pressure of the steam which passes from the cylinder through the stuffing-box, neck-ring, back-ring, and follower, into the gland-chamber 14, whence it is prevented from escaping by the fluid-tight joints formed between the gland and stop-ring, between the stop-ring and the packing, and between the packing and the rod.

Now, in rod-packing of this type, as the bore or inner concave faces of the packing-segments are worn away and the segments close upon the rod to compensate said wear, each of the segments tends to move pivotally about a point adjacent to the outer end thereof, or that end which overlaps the inner or wedge-shaped end of the complementary segment. Referring to Fig. 5, which shows the form of the segments after the same have become considerably worn, it will be seen that the radial thickness of the outer overlapping end-portions of the segments is substantially the same as before the segments are worn, while the radial thickness of the opposite or inner overlapped end-portions is considerably reduced. There is also a tendency for the wedge-shaped inner end-portions of the segments to crowd the outer end-portions out away from the rod, and to thus cause the formation of an opening between the rod and the packing adjacent to the points of the wedge-shaped inner ends, and likewise to cause an opening or separation of the end-faces 21 and 22. Referring again to Fig. 5, the original form of the inner concave faces of the segments is represented by the dotted lines $x$, from which it will be seen that the portions of the segments worn away are substantially menisciform, being of greatest radial thickness at the middle portions of the segments and gradually tapering therefrom toward the ends. It will be apparent, for the reasons above stated, that wear of the inner surfaces of the packing-rings cannot be perfectly compensated by closing of the segments upon the rod, and that after the packing has been in use for some time there will be a leakage around the rod adjacent to the ends of the segments, although the middle portions of the segments will continue to conform perfectly to the surface of the rod, and maintain a fluid-tight joint therewith. For this reason it is necessary to employ more than one packing-ring in order to maintain tightness of the packing as a whole, and by disposing the adjoining packing-rings so that the joints of one ring alternate, circumferentially of the rod, with the joints of the other ring, any leakage through one of the rings may be stopped by that portion of the other ring which remains in perfect contact with the rod. It will be understood, of course, that there is no difficulty in maintaining fluid-tight joints between the abutting faces of the packing-rings, which extend perpendicularly to the axis of the rod. It will be noted further, that to prevent leakage as above described, it is essential that the alternating relation of the joints of the adjoining packing-rings be maintained, since if one ring should be shifted circumferentially relatively to the other, so that the joints were in alinement longitudinally of the rod, leakage might occur through both, or any number, of the packing-rings.

In order to prevent circumferential shifting of the packing-rings relatively to each other, as above noted, I provide upon the outer side of each of the segments 20 a cylindro-segmental lug 25 which fits into a similarly formed recess in the inner surface of the retaining-ring 23. The centers of curvature $z$ of the arcuate faces of the lugs 25 are substantially coincident with the axes about which the respective segments tend to move pivotally during the closing thereof upon the rod; and the recesses, into which said lugs 25 fit, are so located in the retaining-ring that the joints of the packing-rings will be maintained in the desired circumferentially alternating relation; the only movement of the lugs 25, relative to the retaining-ring, being a slight rolling of the same within the recesses, due to the pivotal movements of the segments about the axes z.

In packing of this type, as customarily constructed heretofore, the segments have been provided near the ends thereof with lugs which were adapted to rest against the inner face of the retaining-ring, the purpose of said lugs being to prevent the outward displacement of the ends of the segments, due to the crowding beneath the same of the wedge-shaped opposite ends of the complementary segments, as hereinbefore mentioned. Said lugs did not, however, interengage with the retaining-ring to prevent relative circumferential movement of the packing-rings, and consequently it was possible for the adjoining packing-rings to shift circumferentially until the joints were in alinement longitudinally of the rod. Moreover, the material in the packing-rings is usually a somewhat soft and malleable metal, and as the lugs and the retaining-ring had merely a point- or line-contact with each other, the material forming the lugs would readily upset at the points of contact with the retaining-ring, whereby the lugs would fail to effect the function for which they were intended, namely, that of preventing outward displacement of the outer overlapped ends. The lugs 25, as employed in my packing, present a broad contact or bearing-surface for engagement with the retaining-ring, and the area of bearing-surface is thus great enough to prevent upsetting of the metal in the lugs, so that it is substantially impossible for the packing to fail through outward displacement of the ends of the segments. This is of particular importance in preventing leakage at the joints between the end-faces 21 and 22, for it is apparent that a fluid-tight joint must be maintained between said faces, especially those of the packing-ring which engages the stop-ring 15.

On each of the segments 20, near the end opposite the lug 25, there is provided a small rectangular lug 26 which serves to prevent circumferential shifting of the retaining-spring 24, and insures that the springs will always bear upon the segments at points near the ends thereof which have the greatest inward movement, whereby the springs will be most effective in closing the segments upon the rod. It will be noted that ordinarily the retaining-springs for packing of this type are made normally straight, whereby the ends thereof bear against the retaining-ring while the middle portion of the spring bears against the packing-ring. The pressure of the spring is thus exerted upon a point near the middle of the segment, where it is not so effective in closing the segment upon the rod as when the pressure is exerted near the end of the segment. Moreover, as the ends of the spring move away from each other during the inward movement of the segment, should the inner face of the retaining-ring become scored or grooved where the ends of the spring engage the same, said ends of the spring are liable to become caught in said scores or grooves, and the spring thus prevented from straightening, so as to be ineffective for pressing inwardly upon the segment. Besides preventing circumferential shifting of the retaining-springs, the lugs 26 maintain a suitable space between the retaining-ring and the bodies of the segments, into which the springs may be readily inserted when assembling new packing upon the rod.

Referring now to the modified form of the packing shown in Figs. 3, 4 and 6, the retaining-ring 23, the springs 24, and the outer portions of the segments, including the lugs 25 and 26, are of the same form and have the same functions as hereinbefore described. The body-portions 200 of the segments are of rectangular transverse section, as before, but the slidably engaging faces 210 and 220 of the overlapping ends of the segments are made tangent to a cylinder slightly larger in diameter than the rod or the bore of the packing-ring. In consequence of this variation in the location of said faces, there is a shoulder or face 221 formed at the end of the face 220 and extending radially to the rod and the face 210 does not terminate at a sharp edge adjoining the rod, there being at the end of said face 210 a face 211 which extends substantially radial to the rod and forms an abutment opposing the shoulder or face 221. When the packing is new there is a considerable space between said opposing faces 211 and 221, and said space is filled with a block or plug 27 of a metal which is softer, or more ductile and malleable than the metal of which the main bodies of the segments is made. For example, the main bodies of the segments are usually made of a metal such as hard babbitt, or a soft brass or bronze composition, whereas the blocks or plugs 27 may be of a metal such as lead. In this form of the packing, as the segments are worn and close upon the rod, the faces 221 and 211 gradually approach each other and thus reduce the volume of the space between them. But the soft-metal blocks or plugs 27, being confined at all sides, oppose the closing of the segments, and the latter are thus prevented from moving inwardly except by deforming the soft blocks and squeezing the material thereof against the rod, so that it will be worn and carried away thereby. This form of the packing is especially suitable for use with high-pressure steam, and when so used the soft-metal blocks greatly prolong the effective life of the packing by preventing excessive pressure between the packing and rod, with consequent rapid wear and depreciation of the packing-rings. It will be obvious, of course, that the total pressure to which the packing is subjected, both from the retaining-springs and from the pressure of steam within the gland-chamber, must be slightly more than enough to effect the deformation of the blocks 27, as otherwise the packing-rings would be entirely prevented from closing upon the rod and thus compensating wear of the contacting surfaces. In order to prevent loss of the blocks 27 when assembling, or removing and replacing the packing, the blocks are formed with projecting lugs or tongues 28 and 29, which fit into recesses formed in the adjoining portions of the segments. Said lugs or tongues are cylindro-segmental in the form shown, the lug 28 extending parallel with the rod and the lug 29 extending substantially radial thereto. The recesses in the segments, into which the lugs 28 and 29 extend, are conveniently formed by drilling holes into the segments in the appropriate directions, and the blocks and lugs are conveniently formed by pouring molten metal into the spaces formed between the segments when the same are held in their proper assembled relation. It will be seen that the two lug-recesses intersect in a T-shaped form, and that substantially all of the soft metal except that forming the lugs 28 and 29 is displaced when the packing-ring has reached its limit of wear, as shown in Fig. 6.

Referring again to the general arrangement of the packing, it will be noted that there is sufficient clearance space in the gland-chamber 14, around the retaining-ring, stop-ring, follower and back-ring, to enable lateral movement of all of said parts should the rod not be concentric with the openings through the gland and neck-ring.

Now, having described my invention, what I claim and desire to secure by Letters Patent is:

1. In a metallic rod-packing, a packing-ring comprising a symmetrical pair of seg-ments having overlapped chordal end-faces, each of said segments having upon the outer overlapped end thereof a cylindro-segmental lug of which the axis of curvature is parallel with the axis of the bore and is adjacent to the chordal end-face, and a retaining-ring disposed around said packing-ring and having oppositely disposed cylindro-segmental recesses in the bore thereof receiving the cylindro-segmental lugs of the segments and providing a bearing-surface of large area for said lugs, whereby to prevent outward displacement of said ends of the segments while allowing pivotal movement of the segments about the axes of curvature of the lugs as the opposite ends of the segments swing inwardly to compensate wear of the bore-surfaces.

2. In a metallic rod-packing, a packing-ring comprising a pair of symmetrical seg-ments having inclined overlapping end-ments having bearing means at the outer overlapped faces, bearing means at the outer overlapped ends of the segments forming pivotal axes therefor at fixed positions radially of the rod, means tending to move the segments about said axes inwardly of the rod, and deformable means between portions of the segments adjoining the rod and adapted to limitedly resist closing of the segments toward the rod.

3. In a metallic rod-packing, a packing-ring comprising symmetrical segments having contacting inclined overlapping ending faces and recesses formed at the inner termini of said end-faces adjoining the bore of the ring, soft-metal blocks disposed in said recesses and completely filling the same, whereby to oppose closing movement of the segments toward the bore of the ring, and means engaging the outer portions of the segments for pressing the same inwardly.

JOHN BADEKER.